(12) United States Patent
Jakob

(10) Patent No.: US 11,467,931 B2
(45) Date of Patent: Oct. 11, 2022

(54) METHOD AND SYSTEM FOR FUNCTION-SPECIFIC TIME-CONFIGURABLE REPLICATION OF DATA MANIPULATING FUNCTIONS

(71) Applicant: Seagate Technology LLC, Cupertino, CA (US)

(72) Inventor: Holger Jakob, Finsterhennen (CH)

(73) Assignee: Seagate Technology LLC

( * ) Notice: Subject to any disclaimer, the term of this patent is extended or adjusted under 35 U.S.C. 154(b) by 672 days.

(21) Appl. No.: 16/377,703

(22) Filed: Apr. 8, 2019

(65) Prior Publication Data

US 2019/0235981 A1 Aug. 1, 2019

Related U.S. Application Data

(63) Continuation of application No. 12/262,308, filed on Oct. 31, 2008, now abandoned, which is a continuation-in-part of application No. 12/140,296, filed on Jun. 17, 2008, now abandoned, which is a continuation-in-part of application No. 11/939,633, filed on Nov. 14, 2007, now Pat. No. 7,921,268.

(60) Provisional application No. 60/949,357, filed on Jul. 12, 2007.

(30) Foreign Application Priority Data

Nov. 27, 2007 (EP) .................................... 07023056
May 15, 2008 (EP) .................................... 08009002

(51) Int. Cl.
*G06F 16/00* (2019.01)
*G06F 11/20* (2006.01)

(52) U.S. Cl.
CPC ...... *G06F 11/2094* (2013.01); *G06F 11/2082* (2013.01); *G06F 11/2071* (2013.01)

(58) Field of Classification Search
None
See application file for complete search history.

(56) References Cited

U.S. PATENT DOCUMENTS

| 5,778,165 A | 7/1998 | Saxon |
| 5,799,321 A | 8/1998 | Benson |
| 6,256,634 B1 | 7/2001 | Moshaiov et al. |

(Continued)

FOREIGN PATENT DOCUMENTS

| WO | 99/50747 A1 | 10/1999 |
| WO | 02/25445 A2 | 3/2002 |

OTHER PUBLICATIONS

Denehy, et al., "Bridging the Information Gap in Storage Protocol Stacks," Proceedings of the general track, 2002, USENIX annual technical conference, USENIX Association.

*Primary Examiner* — Debbie M Le
(74) *Attorney, Agent, or Firm* — Hall Estill Law Firm

(57) ABSTRACT

The system (10) and method (100) of the invention provides for function-specific replication of data manipulating functions (12) performed on data, such as files or objects, with a configurable time delay (14) for each function to be replicated. The system (10) and method (100) includes a replication management module (40) for managing the consistent function specific replication of data manipulating functions (12) with a function-specific delay (14) between a source storage system(s) (20, 65) and a destination storage system(s) (30, 75) and optionally includes a replication monitoring database (42).

20 Claims, 18 Drawing Sheets

(56) References Cited

U.S. PATENT DOCUMENTS

| | | |
|---|---|---|
| 6,260,125 B1 | 7/2001 | McDowell |
| 6,405,295 B1 | 6/2002 | Bando |
| 6,785,786 B1 | 8/2004 | Gold |
| 6,807,632 B1 | 10/2004 | Carpenter et al. |
| 6,976,165 B1 | 12/2005 | Carpenter et al. |
| 7,159,070 B2 | 1/2007 | Kilian et al. |
| 7,162,571 B2 | 1/2007 | Kilian et al. |
| 7,222,233 B1 | 5/2007 | Rubin |
| 7,249,251 B2 | 7/2007 | Todd et al. |
| 7,263,576 B2 | 8/2007 | Todd |
| 7,281,084 B1 | 10/2007 | Todd et al. |
| 7,320,059 B1 | 1/2008 | Armangau et al. |
| 7,350,041 B1 | 3/2008 | Armangau et al. |
| 7,366,836 B1 | 4/2008 | Todd et al. |
| 7,369,977 B1 * | 5/2008 | Clune ................ G06Q 10/0633 370/227 |
| 7,376,681 B1 | 5/2008 | Todd et al. |
| 7,392,235 B2 | 6/2008 | Armangau et al. |
| 7,428,621 B1 | 9/2008 | Todd et al. |
| 7,430,645 B2 | 9/2008 | Todd et al. |
| 7,444,389 B2 | 10/2008 | Kilian et al. |
| 7,539,813 B1 | 5/2009 | Todd et al. |
| 7,580,961 B2 | 8/2009 | Todd et al. |
| 7,634,534 B2 * | 12/2009 | Kubota ................ H04L 69/329 709/217 |
| 7,651,593 B2 * | 1/2010 | Prahlad ............... G06F 16/2365 202/204 |
| 7,689,599 B1 | 3/2010 | Shah et al. |
| 7,698,516 B2 | 4/2010 | Todd et al. |
| 7,765,191 B2 | 7/2010 | Armangau et al. |
| 7,801,920 B2 | 9/2010 | Todd et al. |
| 7,805,470 B2 | 9/2010 | Armangau et al. |
| 7,921,268 B2 * | 4/2011 | Jakob .................... G06F 3/0689 711/162 |
| 7,966,293 B1 | 6/2011 | Owara |
| 2001/0056425 A1 | 12/2001 | Richard |
| 2003/0101327 A1 | 5/2003 | Beck |
| 2004/0107199 A1 | 6/2004 | Dalrymple et al. |
| 2005/0125411 A1 | 6/2005 | Kilian et al. |
| 2005/0193084 A1 | 9/2005 | Todd et al. |
| 2005/0278385 A1 | 12/2005 | Sutela et al. |
| 2005/0289152 A1 | 12/2005 | Earl et al. |
| 2006/0004689 A1 | 1/2006 | Chandrasekaran et al. |
| 2006/0031653 A1 | 2/2006 | Todd et al. |
| 2006/0235821 A1 | 10/2006 | Armangau et al. |
| 2006/0235893 A1 | 10/2006 | Armangau et al. |
| 2006/0235908 A1 | 10/2006 | Armangau et al. |
| 2006/0271605 A1 | 11/2006 | Petruzzo |
| 2006/0294115 A1 | 12/2006 | Armangau et al. |
| 2006/0294163 A1 | 12/2006 | Armangau et al. |
| 2007/0011361 A1 * | 1/2007 | Okada .................. G06F 3/0619 710/8 |
| 2007/0050415 A1 | 3/2007 | Armangau et al. |
| 2007/0185936 A1 | 8/2007 | Derk et al. |
| 2008/0034018 A1 | 2/2008 | Cisler et al. |
| 2008/0307527 A1 | 12/2008 | Kaczmarski et al. |
| 2013/0006938 A1 | 1/2013 | Prahlad et al. |

* cited by examiner

Configuration Table for Storage Array requiring Replication Monitoring Database

| Function | Priority | Delay | Modifier | Source | Target |
|---|---|---|---|---|---|
| Write | 1 | 0 | N/A | \\Server1\Share1\ | \\Server4\Share3\ |
| Update | 2 | 1Day | N/A | \\Server1\Share1\ | \\Server4\Share3\ |
| Delete | 3 | 6Months | N/A | \\Server1\Share1\ | \\Server4\Share3\ |
| Write | 1 | 0 | Directory1 | \\Server1\Share2\ | \\Server3\Share1\ |
| Update | 2 | 1Day | Directory1 | \\Server1\Share2\ | \\Server3\Share1\ |
| Delete | 4 | 6Months | Directory1 | \\Server1\Share2\ | \\Server3\Share1\ |
| Delete-Disable | 3 | 1Week | Directory1 | \\Server1\Share2\ | \\Server3\Share1\ |
| Write | 1 | 1Day | Directory2 | \\Server1\Share2\ | \\Server3\Share1\ |
| Update | 2 | 2Days | Directory2 | \\Server1\Share2\ | \\Server3\Share1\ |
| Delete | 4 | 6Months | Directory2 | \\Server1\Share2\ | \\Server3\Share1\ |
| Delete-Disable | 3 | 1Week | Directory2 | \\Server1\Share2\ | \\Server3\Share1\ |

Configuration Table for Storage Array with Query Functionality (Centera)

| Function | Priority | Delay | Modifier | Source | Target |
|---|---|---|---|---|---|
| Write | 1 | 0 | Email | 192.168.10.10 | 192.168.10.50 |
| Write | 2 | 1Day | FileArchive | 192.168.10.10 | 192.168.50.50 |
| Delete | 3 | 0 | Email | 192.168.10.10 | 192.168.10.50 |
| Delete | 4 | 6Months | FileArchive | 192.168.10.10 | 192.168.50.50 |
| | | | | | |

Configuration Table

*FIG. 14*

Source Change Table corresponding to Table1 in Fig 14.

| Source | Function | Time | Modifier | Completed |
|---|---|---|---|---|
| \\Server1\Share1\File1.doc | Write | 2008.04.06 12:45:23 | N/A | YES |
| \\Server1\Share1\File2.doc | Update | 2008.04.06 12:49:15 | N/A | YES |
| \\Server1\Share2\Directory1\Subdir2\File3.xls | Write | 2008.04.06 12:51:19 | Directory1 | NO |
| \\Server1\Share2\Directory1\Subdir2\File3.xls | Delete-Disable | 2008.04.06 12:51:25 | Directory1 | NO |

*FIG. 15*

Oustanding replications table based on example in Fig 14 and Fig 15

| Target | Function | Replication Time | Completion |
|---|---|---|---|
| \\Server4\Share3\File1.doc | Write | 2008.04.06 12:45:23 | NO |
| \\Server4\Share3\File2.doc | Update | 2008.04.07 12:49:15 | NO |
| \\Server3\Share1\Directory1\Subdir2\File3.xls | Write | 2008.04.06 12:51:19 | NO |
| \\Server1\Share2\Directory1\Subdir2\File3.xls | Delete-Disable | 2008.04.13 12:51:25 | NO |

*FIG. 16*

Replication Audit Table listing the completed function-specific delayed replication of replicated functions

| Source File/object (UNC path) 144 | Function | Time | Modifier | Target | Replication Time | Completion |
|---|---|---|---|---|---|---|
| \\Server1\Share1\File1.doc | Write | 2008.04.06 12:45:23 | N/A | \\Server4\Share3\File1.doc | 2008.04.06 12:45:23 | Yes |
| \\Server1\Share1\File2.doc | Update | 2008.04.06 12:49:15 | N/A | \\Server4\Share3\File2.doc | 2008.04.07 12:49:15 | Yes |
| \\Server1\Share2\Directory1\Subdir2\File3.xls | Write | 2008.04.06 12:51:19 | Directory1 | \\Server3\Share1\Directory1\Subdir2\File3.xls | 2008.04.06 12:51:19 | Yes |
| \\Server1\Share2\Directory1\Subdir2\File3.xls | Delete-Disable | 2008.04.06 12:51:25 | Directory1 | \\Server3\Share1\Directory1\Subdir2\File3.xls | 2008.04.13 12:51:25 | Yes |

*FIG. 17*

Configuration Table for High Availability Replication

| Function | Priority | Delay | Modifier | Source | Target |
|---|---|---|---|---|---|
| Write | 1 | 0 | N/A | \\Server1\Share1\ | \\Server4\Share3\ |
| Update | 2 | 0 | N/A | \\Server1\Share1\ | \\Server4\Share3\ |
| Delete | 3 | 0 | N/A | \\Server1\Share1\ | \\Server4\Share3\ |

Configuration Table for Recoverability of Files

| Function | Priority | Delay | Modifier | Source | Target |
|---|---|---|---|---|---|
| Write | 1 | 0 | N/A | \\Server1\Share1\ | \\Server4\Share3\ |
| Update | 2 | 1Day | N/A | \\Server1\Share1\ | \\Server4\Share3\ |
| Delete | 3 | 6Months | N/A | \\Server1\Share1\ | \\Server4\Share3\ |

Configuration Table for Recoverability with one user overriding defaults

| Function | Priority | Delay | Modifier | Source | Target |
|---|---|---|---|---|---|
| Write | 1 | 0 | N/A | \\Server1\Share1\ | \\Server4\Share3\ |
| Update | 2 | 1Day | N/A | \\Server1\Share1\ | \\Server4\Share3\ |
| Delete | 3 | 6Months | N/A | \\Server1\Share1\ | \\Server4\Share3\ |
| Write | 1 | 0 | User1 | \\Server1\Share1\ | \\Server4\Share3\ |
| Update | 2 | 0 | User1 | \\Server1\Share1\ | \\Server4\Share3\ |
| Delete | 3 | 0 | User1 | \\Server1\Share1\ | \\Server4\Share3\ |

Configuration Table examples

*FIG. 18*

METHOD AND SYSTEM FOR FUNCTION-SPECIFIC TIME-CONFIGURABLE REPLICATION OF DATA MANIPULATING FUNCTIONS

RELATED APPLICATION

This application is a continuation of U.S. patent application Ser. No. 12/262,308 filed Oct. 31, 2008 which is a continuation-in-part of U.S. patent application Ser. No. 12/140,296, of the same title, filed Jun. 17, 2008, now abandoned, which is a continuation-in-part of U.S. patent application Ser. No. 11/939,633, of the same title, filed Nov. 14, 2007, now U.S. Pat. No. 7,921,268, which claims priority to U.S. provisional application No. 60/949,357, of the same title, filed Jul. 12, 2007, the contents of which are incorporated by reference hereto.

FIELD OF THE INVENTION

The present invention relates generally to storage systems, which are able to store digital objects or files. More specifically, the present invention relates to data replication systems and methods.

BACKGROUND

Several storage systems provide data replication capabilities for the purpose of either logical error recovery or disaster tolerance, which requires respectively high availability and relatively high integrity. Storage systems allow block, object or file access and provide a means to replicate data from source data storage to a backup data storage system. The method and system for function-specific time-configurable replication of data manipulating functions applies to storage systems allowing object and file access only.

Object-based storage arrays allow applications to integrate a set of commands, typically called an Application Programming Interface (API). The API allows the creation of new objects as well as the modification of existing objects. For Storage arrays that are also providing Write-Once-Read-Many (WORM) functionality, it may not he possible to modify already stored objects. Deletion of objects is possible and in case of WORM storage arrays, deletion is prevented before the specified retention time has expired.

File-oriented storage arrays provide users or applications the possibility of accessing the system using a file-share. These storage systems provide access to the installed capacity using standard file sharing protocols like NFS (meaning Network File System) or CIFS (meaning Common Internet File System). These protocols may also have proprietary extensions to implement special functionality like WORM file systems or WORM shares.

The storage array may also be a standard server running an operating system available from one of the many providers of operating systems. The server would provide access to the available capacity using file shares similar to a file-oriented storage array.

The set of data manipulation functions for object or file oriented storage arrays usually contains functions like write, delete, update, write-disable until expiration date or delete-disable before expiration date. The exact implementation however is dependent on the storage array. Each individual function on a storage array is described in the array specific documentation. If the storage array provides special functions that are not standardized in the protocols like NFS and CIFS the array vendor provides a detailed description of the required integration with the storage array.

Existing object or file oriented storage arrays already provide ways to replicate data between two or more storage arrays. The replication may be implemented on the storage array or on a dedicated system that performs the replication of data. Existing systems also allow replicating changes to the target system. The replication may include or exclude specific functions. If a function is replicated, it is generally replicated as soon as possible.

The changes made to objects or file systems are made by the users or applications making these changes. Users may typically access file oriented storage systems and perform the normal operations like writes, reads, updates or deletes of files. Applications may access both object and/or file oriented storage arrays. As applications are programmed, they may implement rules to make data read-only up to a certain expiration date. The capability to generate new versions of documents and other advanced functionality exist in various solutions available on the market. Among these advanced storage array functionalities in the prior art are applications which also use WORM functionality on storage arrays.

Data replication functionalities of current replication systems are based on fixed, pre-established and non-configurable delays. Consequently, deletion of data that is referred to by otherwise non-deleted files, objects or applications prevents recovery of such data.

U.S. Pat. No. 6,260,125 to McDowell, the content of which is incorporated herein by reference thereto, discloses an asynchronous disk mirroring system for use within a network computer system, wherein a write queue operates to delay the time of receipt of write requests to storage volumes, with a view to increasing data replication performance. The write queues include several write buffers, wherein the write requests pass through the write queue in a first-in, first-out (FIFO) sequence; and so transmission of write requests may be subject to a time-delay by either a pre-determined amount of time or when the storage or write buffer is full. McDowell also discloses a log file configured to receive the delayed write requests, for log-based mirror reconstruction and check-pointing of the mirrored volumes. The replication of data by the system of McDowell is limited to updating and writing and does not provide function-dependent data replication, nor does it provide configurable replication of data manipulating functions such as delete or write-disable.

Patent application number WO 99/50747 to Arnon, the content of which is incorporated herein by reference thereto, discloses a method and apparatus for 30 asynchronously updating a mirror of data from a source device, whose purpose is to prevent the overwriting of data on a source storage that has not yet been committed to a target storage system. The Arnon method and apparatus addresses the need for data integrity but does not allow a user to configure replication operations on a function base or time base, and only prevents overwrite of data on a source storage in the situation where data has not been replicated on target storage.

User-controlled data replication of the prior art allows users to control whether replication occurs, but not when it occurs. A system designed by Denehy et al. (Bridging the Information Gap in Storage Protocol Stacks, Denehy and al., Proceedings of the general track, 2002, USENIX annual technical conference, USENIX Association, Berkeley Calif., USA, the content of which is incorporated by reference thereto) allows a user to prioritize data replication actions on specific files based on file designations such as "non-replicated", "immediately replicated" or "lazily replicated." However, such configuration only addresses system performance needs for short lifetime data storage systems, and does not address the needs for system integrity and accident recovery.

Patent application WO 02/25445 to Kamel, the content of which is incorporated herein by reference thereto, discloses a method and system for electronic file lifecycle management. Similar applications are also called Hierarchical Storage Management (HSM) applications. File Lifecycle management and HSM software move files based on rules between different storage systems. The system might also create multiple copies on different storage systems if the defined rules or policies define the lifecycle of a file accordingly.

Given the current interrelationship of data stored on networks, what is needed therefore is a way of ensuring that deleted data on devices that are not backed up may be recovered as long as a user wishes to preserve the ability to restore data including references to the deleted data of such devices from backups.

What is needed is a user-controlled replication system for function-specific replication of data manipulating functions that allows users to control both whether and when replication of data manipulating functions occurs.

What is needed is a system or method that allows synchronizing or configuring the time frame within which a data restore is possible from a target storage system and which enables replicating data manipulating functions performed on object or file based storage arrays.

Further, what is needed is a system which more fully addresses the needs for system high availability, integrity and accident recovery.

SUMMARY OF THE INVENTION

The system and method of the invention provides for function-specific replication for data manipulating functions of digital data, such as files or objects, with a configurable time delay for each function to be replicated. The system includes a source storage system from which a data manipulating function is to be replicated, a destination storage system(s) to which the replicated function on digital data is being replicated to and a replication management module for managing the function specific replication delay and the function replication between the source storage system(s) and the destination storage system(s).

The replication management module of the invention provides functionality allowing: (1) configuration of a delay after which a data manipulating function will be performed on the destination storage system when data stored on the source storage system, modified or created by the function, is replicated on corresponding data on the destination storage system; (2) the replication of the data manipulating function performed on data stored on the source storage system with the configured delay to the destination storage system; and (3) querying of function-specific changes to data of the source storage system in a given timeframe.

It is an object of the invention to provide a system and method which meets the business need of combining both data replication for high availability and disaster tolerance as well as recoverability of data in case of logical errors.

It is another object of the present invention to provide a system and method for function specific replication of data manipulating functions on digital data that is adaptable to a wide range of storage system architectures, including object-based storage arrays having an application programming interface, file-based storage arrays, and standard computer servers.

It is a further object of the present invention to provide a system and method for function specific replication of data manipulating functions on digital data that can be implemented in hardware abstraction and virtualization software.

It is yet a further object of the present invention to provide a system and method for function specific replication of data manipulating functions on digital data that is easily scalable to several and even a large number of destination storage systems.

It is an object of the invention to provide a system and method which replicates the data manipulating function itself and not the data changes.

In an advantage, the system and method solves the business need of combining both data replication for high availability and disaster tolerance as well as providing recoverability of data in case of logical errors.

In another advantage, the combination of object or file replication for disaster tolerance with the ability to configure the delay of the replication for each function that can be performed on the stored objects or files provides both disaster tolerance and the ability of recovering from logical errors.

In another advantage, the method makes replication of data manipulating functions dependent on the function that was performed on the data as well as makes the delay of the replication time-configurable, in that the replication of new objects or files can be performed as quickly as possible but the replication of another function like deletes of objects or files may be delayed for a configurable amount of time, thereby providing a solution for both disaster tolerance and logical error recovery. This allows the customer to ensure that data on storage arrays that is not backed up is recoverable for the same time that a restore and recovery of references to these objects or files is possible. Such system thus guarantees that all objects and files are available for recovery as long as references to that data may be restored from backups.

In another advantage, the system and method of the invention delays the deletion of data from the source storage array for a N period until the data is also deleted from the target storage array, thereby allowing the restoring of an application database using the standard recovery procedure as well as providing the possibility of accessing the previously deleted data on the secondary storage array without having to have a complete backup of all data having ever been written to the source storage array. Once the standard recovery procedure is no longer capable of restoring and recovering references to data, the file or object referenced can also be deleted on the target storage array.

BRIEF DESCRIPTION OF THE DRAWINGS

FIG. 14 is a schematic representation of the configuration table of the invention.

FIG. 15 is a schematic representation of the Source Change Table of the invention.

FIG. 16 is a schematic representation of the Outstanding Replications Table of the invention.

FIG. 17 is a schematic representation of the Replication Audit Table of the invention.

FIG. 18 lists examples of different customer requirements and how they are implemented in a configuration table.

DETAILED DESCRIPTION

Figure 1:
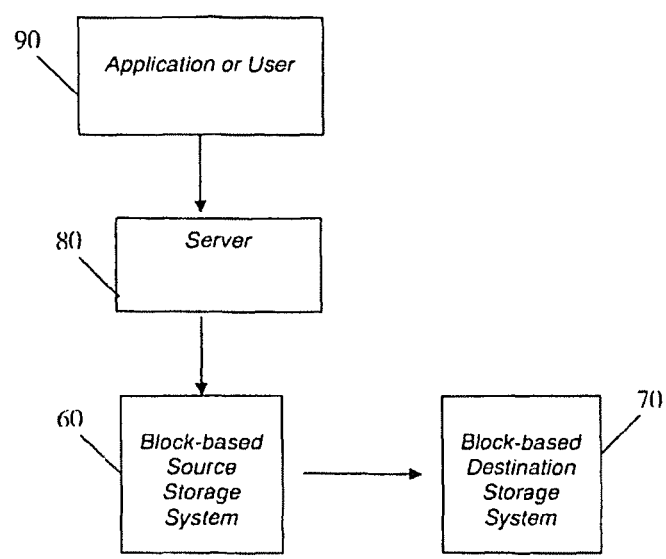
FIG. 1 is a schematic diagram of a block-based storage system of the prior art where the replication management module is located in the source storage array.

Referring now to FIG. 1, a block-based source storage system 60 of the prior art provides a server 80 access to a certain disk capacity. The operating system installed on server 80 possesses the knowledge of where and which object or file lies within this disk capacity. This information can, for example, be stored in the File Allocations Table or I-nodes. An application or User 90 accessing a file on such a server 80 would therefore issue any function-based calls like write, update and delete to that server 80 who in turn knows where the file is located on the block-based source storage system 60. Any function performed by an application or user 90 will result in an update or read of a block on the disk capacity available to the server 80. The replication of writes or update of a block on the source storage array 60 is embodied in the source storage system 60.

Figure 2:
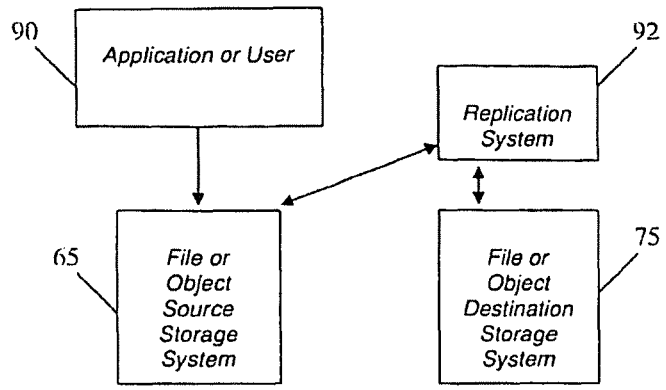
FIG. 2 is a schematic diagram of an object or file based storage array of the prior art where the replication management module is implemented in a separate system.

Referring now to FIG. 2, object or file based storage arrays 65 and 75, respectively, provide the functionality of the server 80 mentioned above directly from within the storage array 65 and 75. The application or user 90 accessing a file issues the functions directly to the storage array. For the purpose of abstraction, a server 80 providing file based access to the available disk capacity on source storage array 65 is also contained in the file based storage arrays because whether he accesses the server or the storage array is not differentiable by an application or user. To the application or user, they both provide the same functionality of file level access using file access protocols like CIFS or NFS. The replication from the file or object based source storage system 65 to the corresponding target storage array 76 is embodied in the source storage system 65.

Referring now to FIGS. 3A to 6, a system 10 for function specific replication of data manipulating functions 12 on digital data, such as files or objects, allows for a configurable time delay 14 for each function to be replicated. The system 10 includes a source storage system 20 from which performed data manipulating functions on data are replicated, at least one destination storage system 30 to which performed data manipulating functions are replicated to, a replication management module 40 for managing the function specific replication delay and the replication of data manipulating functions between the source storage systems and at least one destination storage system, optionally comprising a replication monitoring database 42.

The system 10 provides replication for at least one standard data manipulating function of a group of functions including: write, delete, update, modify, write-disable, write disable until expiration date, delete-disable and delete-disable until expiration date.

The replication management module 40 provides several novel features. One feature allows for the configuration of a delay after which a specific data manipulating function on data stored on the source storage system is replicated on corresponding data on the destination storage system. Another feature allows for replication of the data manipulating function performed on data stored on the source storage system with the configured delay to the destination storage system. Still another feature allows for querying function-specific changes to data of the source storage system in a given timeframe.

As for the source storage system 20 for replicating data manipulating functions on digital data, at least one destination storage system 30 is based on one of the following architectures: object-based storage arrays comprising an application programming interface, file-based storage arrays or a computer server, comprising memory 36, a CPU 38 and an operating system 39.

Figure 5:
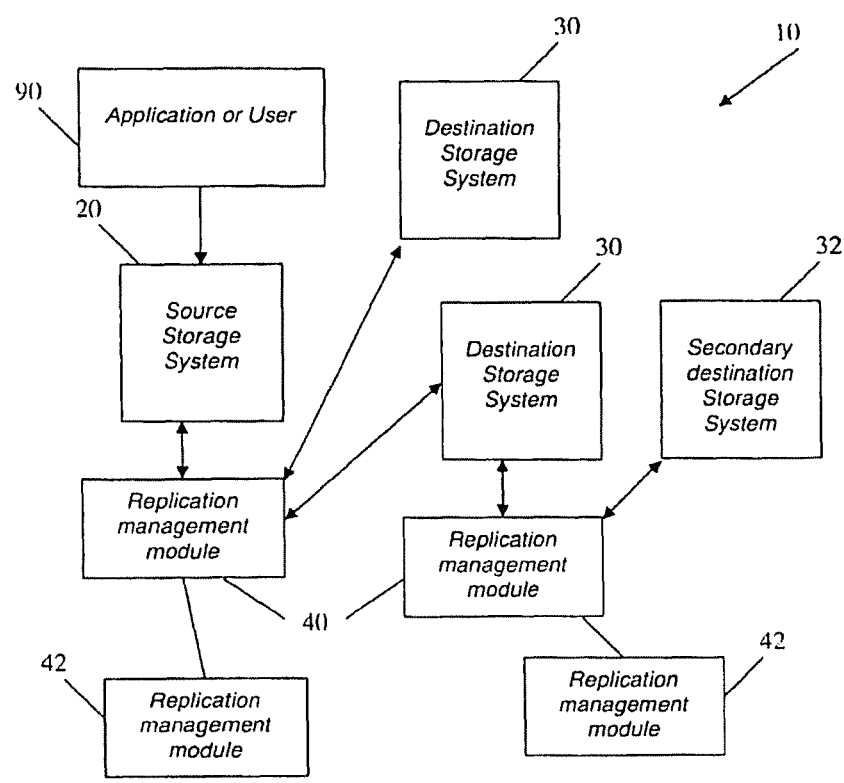
FIG. 5 is a schematic diagram showing the elements of the system for function specific replication of data manipulating functions on digital data with a configurable time delay, having several destination storage systems.

The system 10 may directly provide access to storage systems based on either of the following architectures: object-based storage systems having an application programming interface 34, file-based storage arrays, and a computer server 80, including memory 36, a CPU 38 and an operating system 39 as shown in FIG. 5.

Figure 3A:
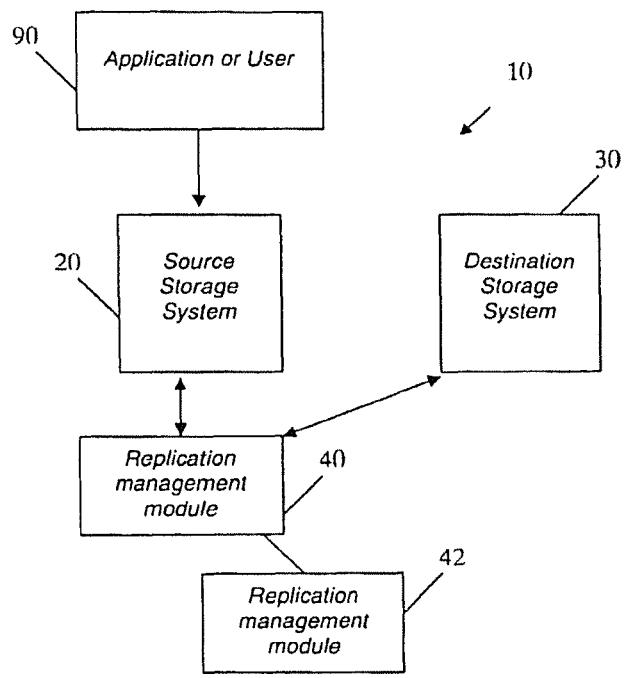
FIG. 3A and FIG. 3B are schematic diagrams showing the elements of the system for function specific replication of data manipulating functions on digital data with a configurable time delay, where the replication management module is located on the source storage system.
Figure 3B:
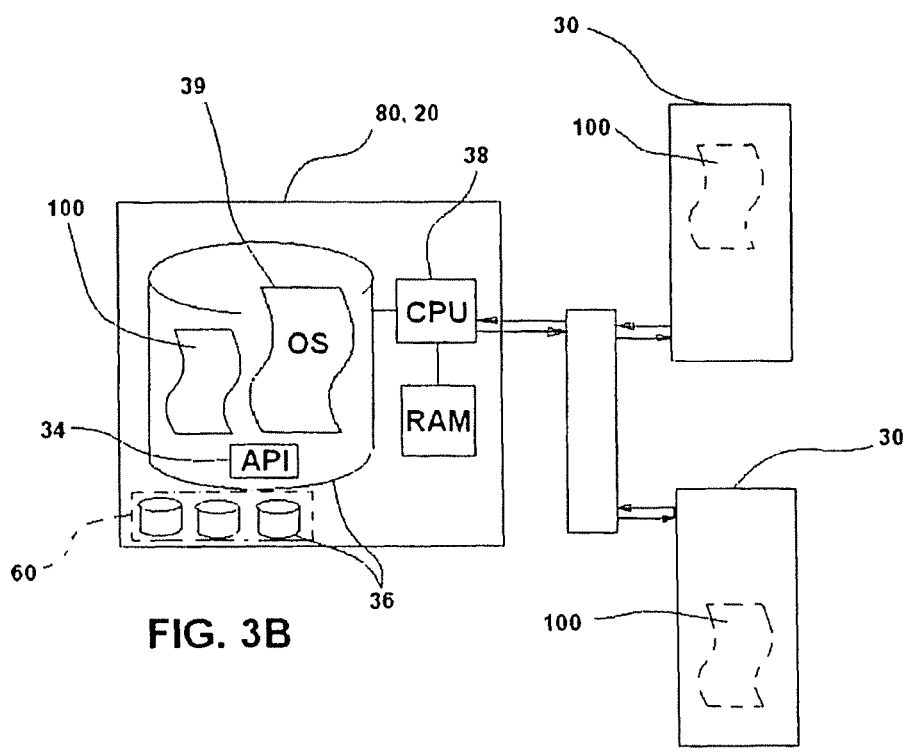
Figure 4:
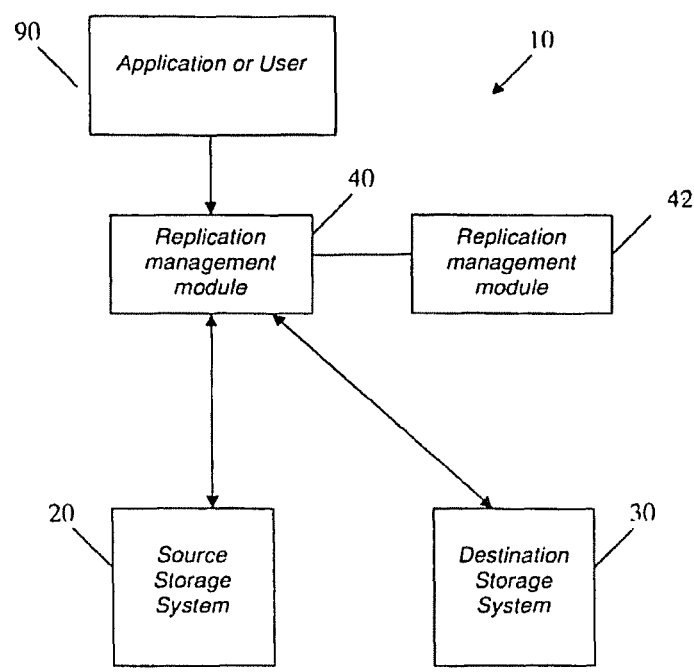
FIG. 4 is a schematic diagram showing the elements of the system for function-specific replication of data manipulating functions with a configurable time delay, where the replication management module is located between the application or user and the source and the destination storage system, thereby providing access to the storage systems.

The system 10 is adaptable to several different system configurations. Referring now to FIG. 3A, a configuration where the replication management module 40 is located on the source storage system 20 is shown. The information about functions performed by applications or users 90 on objects or files stored is gathered by the replication management module from the source storage system 20 and used to replicate each data manipulating function with a configurable delay to the Destination Storage system 30. The information gathered may optionally be stored for future reference in the replication monitoring database 42.

Referring again to FIG. 4 a configuration where the replication management module 40 is located between the application or user 90 and the source and destination storage systems 20 and 30 is shown.

Referring now to FIG. 5, a configuration is shown with several destination storage systems 30, one being a secondary destination storage system 32. The replication management module 40 gathers the information for function-specific replication of data manipulating functions from the Source storage system 20 and replicates to multiple Destination Storage systems 30. A Destination storage system may be used by a second Replication management module as the source storage system to replicate to a secondary destination storage system 32.

Figure 6:
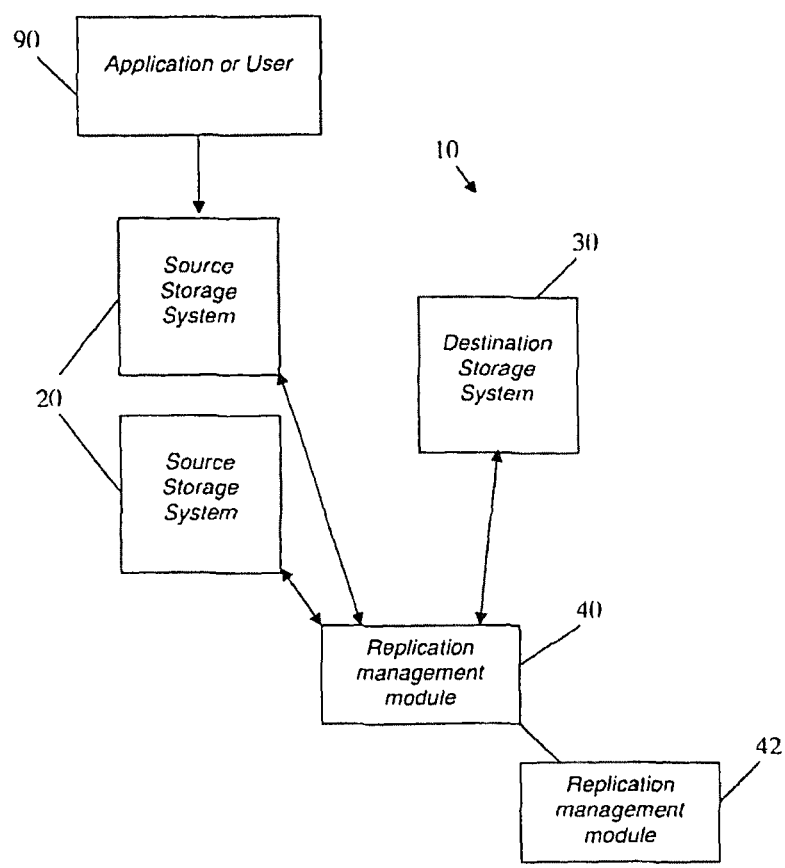
FIG. 6 is a schematic diagram showing the elements of the system for function specific replication of data manipulating functions on digital data with a configurable time delay, having several source storage systems.

Referring now to FIG. 6, a configuration with several source storage systems 20 is shown. One replication management system 40 is gathering information from multiple source storage systems 20. All data manipulating functions performed on multiple source storage systems 20 are replicated to a common destination storage system 30.

The source storage system 20 or the destination storage system 30 are file-based storage arrays, including a server 80 which enables file based access to the available storage capacity of the storage array.

Figure 7:
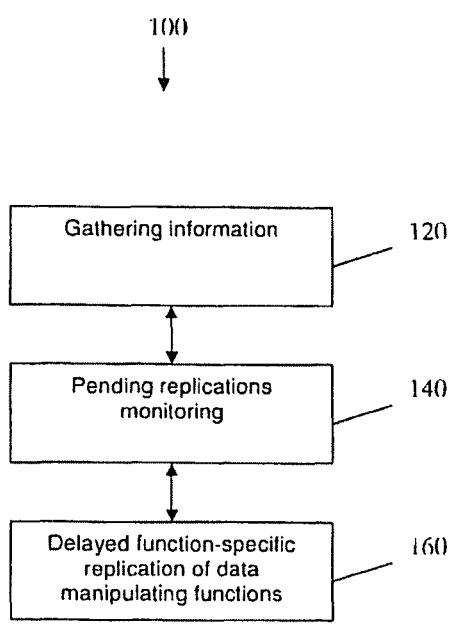
FIG. 7 is a flow chart showing the necessary main steps to implement a function-specific function replication system and method of the present invention.

The method 100 for implementing a function-specific replication of data using system 10, as shown in FIG. 7, involves three parallel functions to be performed continuously in parallel or based on a schedule: Gathering information 120, Pending replications monitoring 140 and Delayed function-specific data replication 160.

Figure 8:
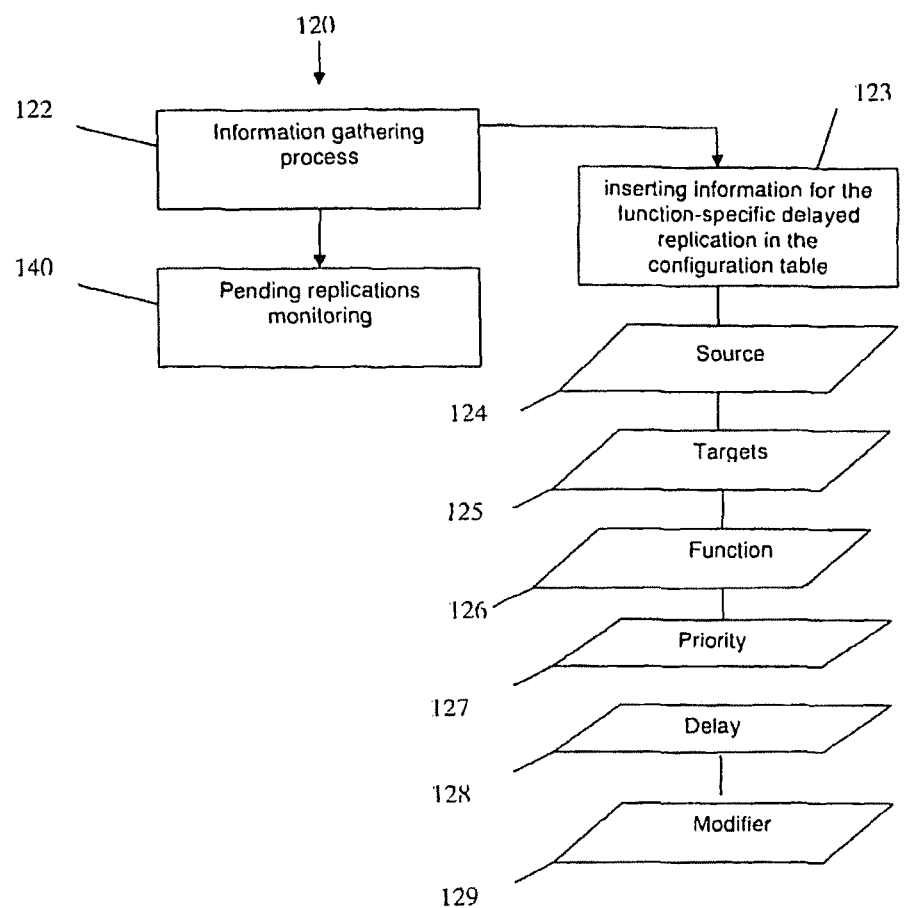
FIG. 8 is a flow chart showing the steps of the information gathering process of the invention for proprietary storage systems of a first class of storage arrays, such class not allowing the querying of the array for changes that were made to the objects or files that are stored on the array.

FIG. 8 shows the gathering of information 120 required for the replication of data manipulating functions that are performed on data stored on a source storage system and replicated to a target storage system. This is achieved by: running an information gathering process 122 using information gathering software, building a replication configuration database 123 including information on the data manipulating functions to be replicated, the source and target storage system, and launching the pending replications monitoring process 140.

The running of an information gathering process 122 includes the substeps of: inserting information from the replication configuration database 123 for the function-specific delayed replication of data manipulating functions in the configuration table 22 of the replication monitoring database, directly from the information gathering software, wherein the information that the information gathering software inserts into the database are:
- the definition of the source storage array 124,
- the definition(s) of the target storage array(s) 125,
- the data manipulating function 126 to be replicated,
- the priority 127 of the specified function,
- the delay 128 after which the specified function is replicated, and optionally the definition of a modifier 129 for more granular function-specific replication.

The priority and the delay are correlated to each other to ensure consistency in the target environment. A typical priority order would assume that new objects created with a write function are of highest priority, changes performed with the update function are of mid-level priority and delete functions of lowest priority. The consequences are that the highest priority delay must be assigned the shortest delay and the lowest priority the longest one. Priority and corresponding delay times 14 are required to ensure the consistency of the target objects or files.

Consistency between source and target storage arrays with respect to replication of data manipulating functions is defined at the data manipulating function level and the integrity rules are defined by business criteria based on the objects to be achieved. There are many different requirements that can be addressed with the current invention. If high availability and disaster recovery are the main requirements, all data manipulating functions (eg.create/write, update and delete) would be associated with a high priority and short delay. If recoverability is the main objective, the priority for data creation functions would be high. Data changes could be of medium priority and delay and most important data deletion functions would be replicated with lowest priority and longest delay. The delay would be configured to be as long as the required recoverability period.

There may be compliance reasons that require a change in priorities for a replication of data manipulating functions. If an employee who leaves a company requests his employer to delete his personal data according to local law, the current invention is able to handle this. In such a situation, the subset of data is configured to replicate deletion functions for this employee with highest priority and then the personal data is deleted. This would remove all pending write or update functions from the replication. In this case, the business requirement is to comply with compliance regulations and not to ensure recoverability or high availability.

In order to make the current invention suitable for today's changing business requirements, preference has been given to the implementation of a priority parameter that allows for the validating of the delay to correspond with the priority of the function. Of course, other implementations are possible should a skilled person be given this application and be asked to use its teachings to derive other implementations.

Referring now to FIG. 18, Table 26 lists, by way of example, different customer requirements and their implementation in configuration tables.

For storage systems that provide information on the authors of changes, data about the originating applications or users, the replication management module can be used to further specify the granularity on which the function-specific data replication should act. For example, the module would allow the replication of delete functions from a SEC compliant application as quickly as possible to ensure that content is deleted once it is permissible under the SEC rules to do so and to delay the replication of a delete function from a file archive application that does not fall under regulatory requirements. This behaviour is specified using the modifier 129 entry in the configuration table.

For file-based storage arrays, a differentiation based on a part of the UNC path may provide similar functionality. Application functions performed by accessing the share \\serve1\share1 can be replicated differently than functions performed by users accessing \\server\share2 or \\server2\share1.

The pending replications monitoring process 140 is a monitoring process for pending replications, which watches for outstanding replications and passes them to the process who does the actual function replication. The Pending replications monitoring periodically queries the source system for changes and inserts them into the database of what has happened on the source (the source change table). In simpler variations this just creates a list of objects if the source array allows querying based on timeframe and function performed).

For source storage arrays 20 that do not allow sending event-based information of the functions performed, the interval in which the pending replications monitoring takes place must be specified.

The inputs into the system 10 and method 100 of the invention implementing the function-specific replication of data manipulating functions 12 are gathered in a graphical user interface 19 and stored in the replication monitoring database configuration input table 22. When replicating data manipulating functions between storage systems that do not require a replication monitoring database, the required configuration information may be provided in a configuration file. This file may be created using a Graphical user interface or by editing the configuration file in a text editor.

The possibility of specifying more than one destination storage system 30 also allows replicating functions with a different delay for each target system.

In order to implement function-specific replication including a configurable time delay 14, the pending replications monitoring process must provide a means for monitoring pending replications and for determining the delay 14 or exact time 16 to replicate the data manipulating function. The replication time 16 to replicate a functional change may be stored in the replication monitoring database 42 and will be used by the pending replications monitoring process 140 and the delayed function-specific data replication process 160.

Tracking of which function was performed on a storage array is dependent on the functionality that the specific storage array provides. The functionality of the storage array also defines the granularity that can be provided to the user of the application.

The existence of the replication monitoring database 42 with all of the required information stored allows changing the delay with which the replication of a data manipulating function should be performed. The replication time in the outstanding replications table 18 can be changed for data manipulating functions that are not yet replicated. The pending replications monitoring process 140 takes into account the changed replication time to initiate the delayed function-specific replication of data manipulating functions 160. Depending on the environment, it allows increasing or decreasing of the delay based on the customer's actual needs. Based on the information that can he queried from the storage systems, the delay might also be configured independently for each application, file system or subset of objects.

The implementation of the system and method for function-specific replication of data manipulating functions requires different versions of the software. Function-specific replication between standard sewers running standard operating systems cannot be implemented the same way as replication between proprietary API-based storage systems. Further detail is provided below of the different functions that need to be present dependent of the storage array.

The replication monitoring database 42 must be configured for each source storage system, notably with regard to identification of the information to be gathered and tracked, so as to enable the correct and consistent replication of the data manipulating function of the present invention to be used. As an example: An object based storage system does not require the same information as a file based storage system for the replication of data manipulating functions.

The required information is condensed into the least amount of data necessary to implement a function-specific and time delayed replication of data manipulating functions.

In order to reduce the complexity of today's storage environments, the virtualization of infrastructures is rapidly being adopted in the market. Storage virtualization software abstracts the physical storage systems into logical entities. Virtualization is a good way to mask ongoing migrations or systems being replaced with newer ones. Virtualization software thus knows which function is being performed on which file or object. The method of the present invention, in particular, the replication features thereof, can be implemented in a virtualization layer that provides direct access to source or target storage systems. The system of the present invention can directly provide access to source and target storage systems as shown in 5 FIG. 4.

The way the function-specific information is retrievable from a storage array depends on the functionality that is implemented on a storage array. It also depends on other functionality aspects like the ability to install and run a process on that storage array.

Today, object or File oriented storage arrays are built based on two different approaches.

In a first approach, file oriented storage may be implemented using hardware that provides file level access based on standard operating systems. These operating systems, such as UNIX, Linux or Windows, allow the installation of additional software that can be used to facilitate the implementation of the present invention.

In a second approach, object and File oriented storage arrays may be implemented using proprietary operating systems like Data "ONTAP", "DART" or "CENTRASTAR". To allow maximum flexibility in changing the time delay for the function-specific replication of data manipulating functions, all detected performed data manipulating functions are gathered as quickly as possible. This means that a deletion of content is recorded once it is discovered by the pending replications monitoring process. This ensures that increasing or decreasing configured delays replicates all outstanding data manipulating functions even when changes are made to the replication delay. It allows updating the replication monitoring database with a new time of replication for all function-specific replications of data manipulating functions not yet completed.

Standard Operating System Based Storage

Standard Operating systems based storage allows the installation and creation of additional software and services on the server that provides the storage services in the network. The pending replications monitoring process 140 runs as such a process on the storage array resp. storage server. Changes in the file systems may either be intercepted or detected and the required information for the function-specific delayed replication of data manipulating functions may be inserted in the database source change table directly from the pending replications monitoring process.

The whole system or an implementation of the method of the present invention may run on a standard operating system based storage server or storage array.

Proprietary Storage Systems

The implementation of the pending replications monitoring process for proprietary storage systems must at least provide the function-specific information for the process 160 for delayed function-specific replication of data manipulating functions. There are two general approaches that need to be differentiated depending on the class of the storage array.

Figure 11:
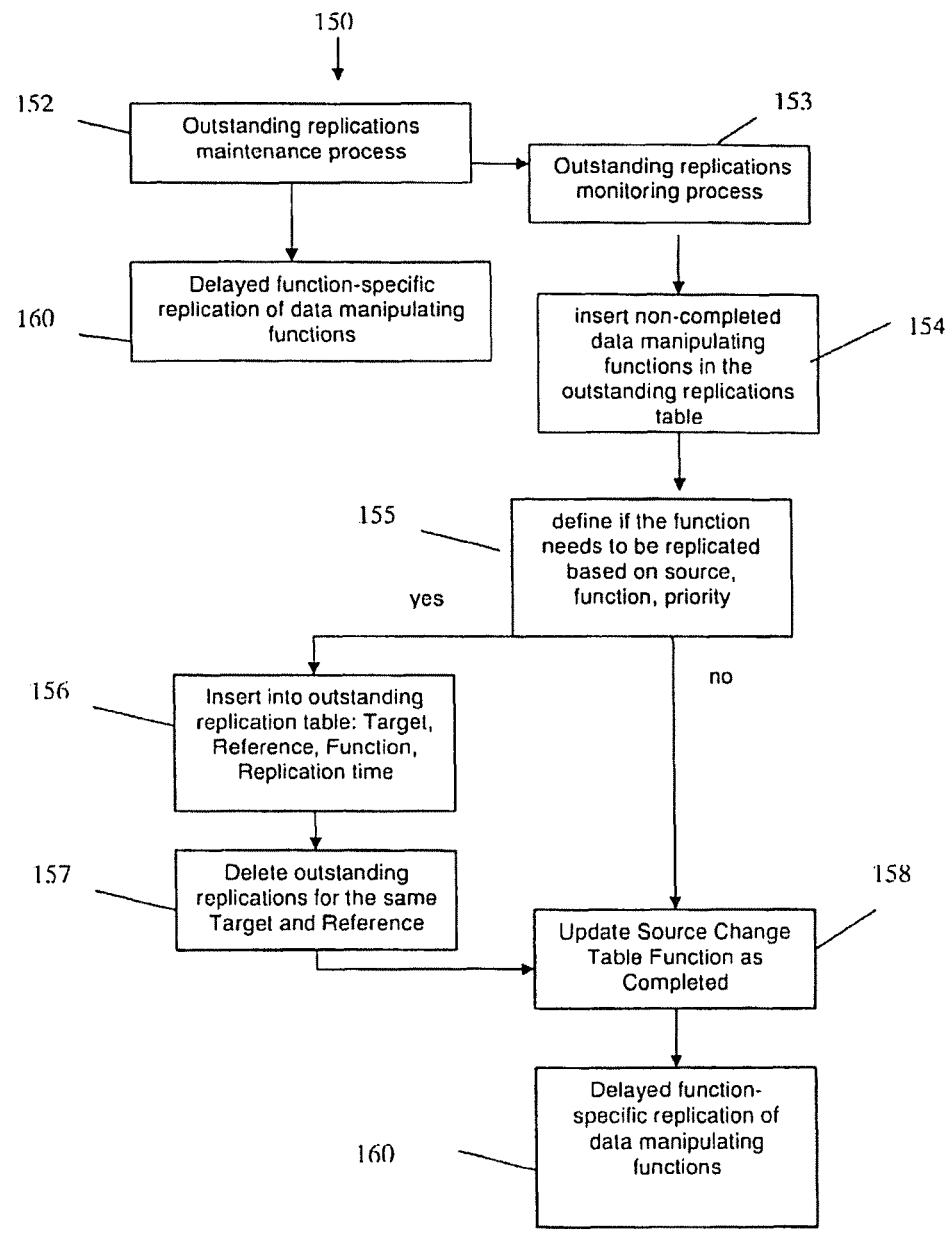
FIG. 11 is a flow chart describing the steps necessary to maintain a consistent set of objects or files on the target storage array.
Figure 12:
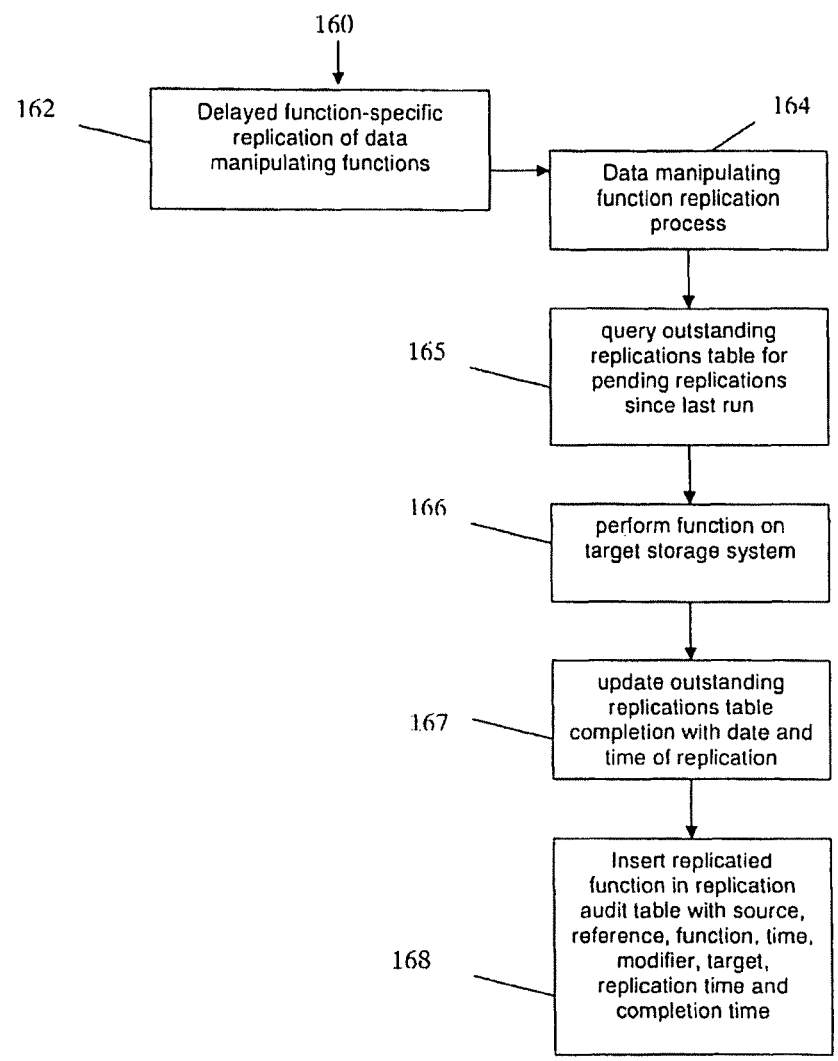
FIG. 12 is a flow chart showing the steps for implementing the delayed function-specific replication of data manipulating functions for a first class of storage arrays based on the replication monitoring database.

A first class of storage arrays does not allow querying the array for changes that were made to the objects or files that are stored on the array. In this situation, the pending replications monitoring process 140 of the system implementing the function-specific delayed data replication is described in FIG. 9. Referring to FIG. 11, the process to maintain consistency in the replication of data manipulating functions is described. FIG. 12 describes the replication of data manipulating functions.

Figure 10:
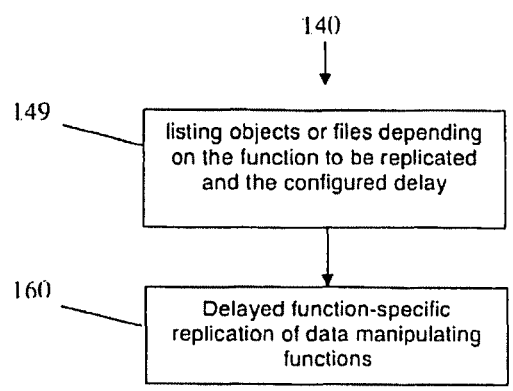
FIG. 10 is a flow chart showing the steps for implementing the replications monitoring process of the invention for a second class of storage arrays, such class not requiring the creation of the replication monitoring database.
Figure 13:
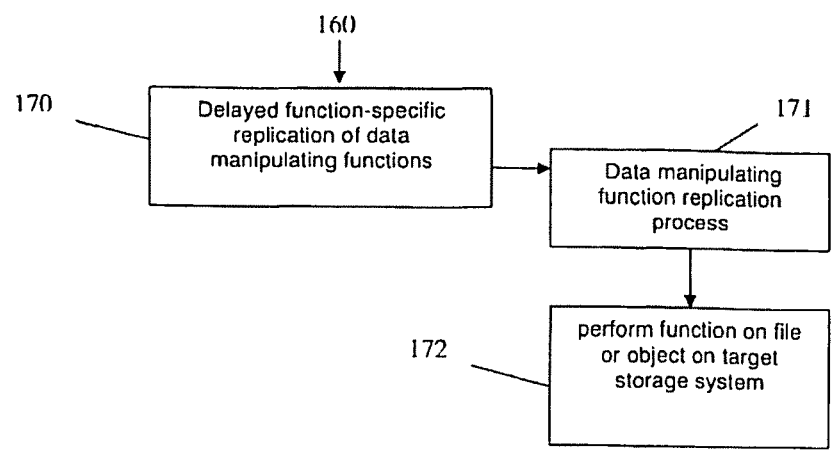
FIG. 13 is a flow chart showing the steps for implementing the delayed function-specific replication of data manipulating functions for a second class of storage arrays that do not require the replication monitoring database.

In a second class of storage arrays, the task of the pending replications monitoring process 140 does not require the creation of an additional database. The pending replications monitoring process as described in FIG. 10 continuously, or in a scheduled way, queries the source storage arrays for changes made to objects or files based on the function to be replicated and additional information such as when or who performed the function. FIG. 13 shows the delayed function-specific replication of data manipulating functions for the second class of storage arrays.

A good example in the category of object-based storage systems with this query functionality is "EMC CENTERA", described at http URLs emc.com/products/family/emc-centera-family.htm, the content of which, including content in links therein. The Query API allows the listing of content based on a timeframe the query is targeted to. The default query would provide a list of objects that may be used to find out when the object was written and who created it. With the same query functionality, the information gathering process 122 can determine which objects were deleted in order to replicate the delete function with the configured delay. The available proprietary storage systems today already provide replication functionality based on independent software or software installed on the storage arrays. The implementation of a function-specific delayed replication on the storage systems has heretofore not been implemented.

Figure 9:
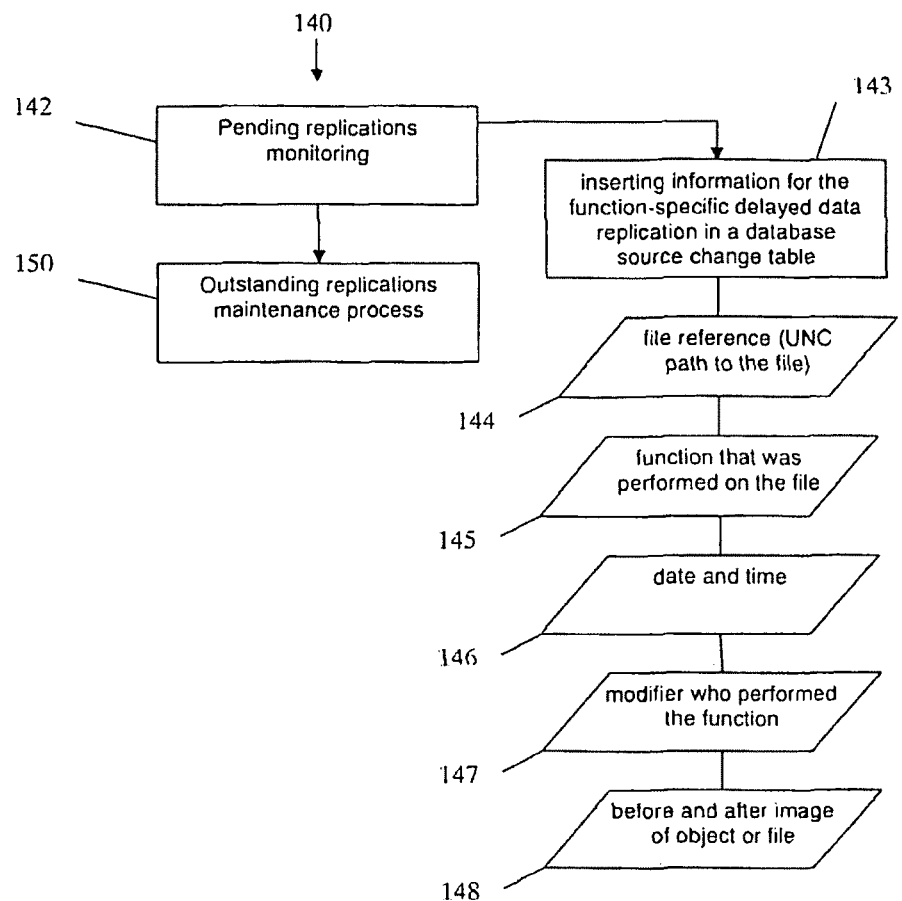
FIG. 9 is a flow chart showing the steps for implementing the replications monitoring process of the invention for proprietary storage systems of a first class of storage arrays for which the task of replication monitoring requires the creation of a replication monitoring database.

Now referring to FIG. 9, the pending replications monitoring process 140 for the first class of storage arrays requiring a replications monitoring database is built in two steps:
 (1) running the pending replications monitoring process 142 continuously or based on a schedule; and
 (2) using information gathered in step 150, the outstanding replications maintenance process, to ensure consistency in the replication process The pending replications monitoring process 140 is made up of the following substeps which build the replications monitoring database source change table:
 inserting the function-specific information required to replicate data manipulating functions 143;
 adding the Source information 144 for the function to be replicated, made up the source storage system as well as the reference for the file or object the function was performed on;
 inserting the function 145 that was performed on the referenced source file or object;
 specifying the following:
  date and time 146 the function was performed; and optionally,
  the modifier 147 who performed the function, and if required,
  the before and after image 148 required to perform the function with the configured delay on the target storage system Referring now to FIG. 10, the pending replications monitoring process 140 is provided for the second class of storage arrays which does not require a replications monitoring database. The pending replications monitoring is implemented in two steps:
 (1) listing the files or objects depending on the function to be replicated with the configured delay 149, and
 (2) passing this information to the delayed function-specific replication of data manipulating functions 160

Referring to FIG. 11, the outstanding replications maintenance process 150 ensures the maintenance of a consistent set of files or objects on the target storage array. The maintenance of the replications monitoring database requires two steps:
 (1) the outstanding replications maintenance process 152 implemented with several substeps detailed below, and
 (2) once the consistency of the functions to be replicated is ensured, launching the delayed function-specific replication of data manipulating functions 160 for the class of storage arrays requiring the replications monitoring database.

The maintenance process 150 itself consists of the steps:
 (1) using the outstanding replications monitoring process 153, checking the source change table for newly arrived functions to be replicated,
 (2) inserting non-completed functions to be replicated in the outstanding replications table 154 with the required information to perform the change;
 (3) determining whether the new function needs to be replicated 155, as, dependent on the source, reference and priority of the function it is decided if the function is replicated;
 (4) if the function is replicated, it is inserted into the outstanding replications table 156 together with the target, reference, function and replication time for the data manipulating function to be replicated;
 (5) the ensuring of the consistency of non-completed data manipulating functions is accomplished in step 157, wherein, if the new function has a higher priority and a shorter delay than other pending functions in the outstanding replications table for the same source and reference, this is accomplished by removing the already pending replications from the outstanding replications table and maintaining only the new function with higher priority;
 (6) for all functions, updating the source change table 158 with the information that the corresponding function has completed it's maintenance step;
 (7) now having ensured a consistent set of outstanding replications, invoking the delayed function-specific replication of data manipulating functions 160.

Referring now to FIG. 12, in which the delayed function-specific replication of data manipulating functions 160 for the first class of storage arrays, the delayed function-specific replication process 162 is made up of several steps, including:
 (1) performing the delayed replication using the data manipulating function replication process 164;
 (2) quarrying all pending functions to be replicated since the last invocation of the process from the outstanding replications table 165 with a replication time prior to the current time;
 (3) performing the data manipulating function on the target storage arrays files or objects 166; and
 (4) completing the functional replication updated in the replication monitoring database outstanding replications table 167, optionally inserting the completion of the replication of the data manipulating function in the replication audit table 168 for audit purposes.

Referring now to FIG. 13, the delayed function-specific replication of data manipulating functions is performed for storage arrays with query functionality not requiring the maintenance of a replications monitoring database. The delayed functions-specific replication process 170 invokes the data manipulation function replication process 171 continuously or based on a schedule. The list of objects or files is available from the replications monitoring process 149 based on the function to be replicated with the configured delay. In step 172, the function is performed on the target storage array's objects or files.

The function-specific time-configurable replication of data manipulating functions for the first class of storage arrays requires a replication monitoring database that provides all the information required to implement a function-specific delayed replication in a consistent manner.

The minimum information that must be available to implement a functional function-specific replication of data manipulating functions is found in the detail description of the four tables below.

---
Configuration Table 22 (FIG. 14)
---
☐ Source: the source object or file based storage system that the function was performed on.
☐ Targets: derived from the configuration input the target storage systems for each source target system.
☐ Function: function to be replicated.
☐ Priority: priority of the specified function
☐ Delay: delay for the specified function.
☐ Modifier: provides possibility to add a higher degree of granularity for the replication of data manipulating functions.
---

Examples of different business requirements and their implementation in a configuration table are listed in in Table 26 in FIG. 18.

---
Source Change Table 24 (FIG. 15)
---
☐ Source: source object or file based storage system that the function was performed on.
☐ Reference: object or file (UNC) reference that the function was performed on.
☐ Function: function that was performed.
☐ Time: date and time the function was performed on the object or file.
☐ Modifier: additional information like application, user, part of the UNC path to provide a more granular data replication.
☐ Completed: once a functional change has been treated by the outstanding replications maintenance process the completion is stored in the Source
Change Table. Simple yes/no flag for quick rebuilds of the outstanding replication table.
☐ Before/After image: All information required for the replication of the functional change on the object or file if necessary for the class of storage array.
---

New entries in the Source Change Table might trigger a function that inserts the corresponding entry or entries in the outstanding replication table. This outstanding replications maintenance process 150 may also run continuously or based on a schedule to update the outstanding replication table.

---
Outstanding Replication Table 18 (FIG. 16)
---
The replication table is based on the configuration table and the inserts into the source change table. Changes in the configuration may require the replication table to be rebuilt for entries in the source change table that were not yet completed.
☐ Target: target system the replication needs to be replicated to.
☐ Reference: object or file (UNC) reference that the function will be replicated to.
☐ Function: function to be replicated.
☐ Replication Time: date and time at which the function needs to be replicated.
☐ Completion: date and time the replication has been performed.
An update with a Completion 'might trigger a function that creates an insert with the required information in the Replication Audit table
---

---
Replication Audit Table 24 (FIG. 17)
---
The audit table provides a means of proving which replications have already been performed.
☐ Source: source object or file based storage system that the function was performed on.
☐ Reference: object or file (UNC) reference that the function was performed on.
☐ Function: function that was performed.
☐ Time: date and time the function was performed on the object or file.
☐ Modifier: additional information like application, user, part of the UNC path to provide a more granular data replication.
☐ Target: target system the replication needs to be replicated to.
☐ Replication Time: date and time the function needs to be replicated by.
☐ Completion: date and time the replication has been performed.
---

The delayed function-specific replication of data manipulating functions 160, for delaying a deletion of data from the source storage system until the data is also deleted from the destination storage system, is achieved by configuring the delete function with the lowest priority and the longest delay used for the function-specific replication of data manipulating functions.

Generally, the delayed function-specific replication of data manipulating functions may run continuously or based on a schedule. In the scheduled way the replication is initiated in regular intervals at specific times. Every time this interval expires, the pending replications monitoring process updates the source change table with non-replicated data manipulating functions, the outstanding replications maintenance process is run if the replication takes place between storage arrays requiring the replication monitoring database and the delayed function-specific replication of data manipulating functions is run for functions with an expired delay. The delayed function-specific replication of data manipulating functions needs to follow the same directions as described in the information gathering and pending replications monitoring sections herein. The replication needs to be implemented for Standard Operating system based storage arrays differently than for proprietary storage systems and depends on the functionality of the storage arrays to be supported. In an example of an Operating System based storage array that provides file sharing the function-specific replication would in case of a write on \\Server1\Share1\File1.doc create the new file on the target storage array under \\Server2\Share5\File1.doc. In case of a proprietary storage array like EMC Centera the function-specific replication would read object FGLSO3eJ90S2 from source storage array reachable at IP Address 192.168.2.A and create the same object FGLSO3eJ90S2 on the source storage array at IP Address 156.172.50.33. In case of the Operating System based replication the replication involves standard file system operations and in the case of EMC Centera the function-specific replication needs to integrate the API required to access the source and target storage array.

In an advantage, the method makes replication of data manipulating functions dependent on the function that was performed on the data as well as makes the delay of the replication time-configurable, thereby providing a solution for both disaster tolerance and logical error recovery. This allows the customer to ensure that data on storage arrays is recoverable for the same time that a restore and recovery from the production references of the objects or files is possible. Such system thus guarantees that all objects and files are available as long as references to that data may be restored from backups.

In another advantage, the system and method of the invention can extend existing function-specific replications without configurable delay by replicating some data manipulating functions with a specified delay. As an example, the replication between a source and a destination storage array would continue to replicate write functions but the replication of delete functions from the source storage array would be delayed using the current invention for a N period until the data is also deleted from the target storage array, thereby allowing the restoring of an application database using the standard recovery procedure and would thus provide the possibility to access the previously deleted data on the secondary storage array without having to have a complete backup of all data having ever been written to the source storage array. Once the standard recovery procedure is also no longer capable of recovering data, the file or object referenced can also be deleted on the target storage array by the delayed function-specific replication of data manipulating functions.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

What is claimed is:

1. A method comprising:
   connecting a replication management module to an upstream user and a downstream data storage system;
   assigning a first delay to a data function originating from the upstream user with the replication management module based on a data manipulation corresponding to data function;
   conducting an information gathering process with a processor of the replication management module to collect information about first target storage array of the downstream data storage system;
   assigning a priority value to the data function with the replication management module based on the collected information about the first target storage array, the priority value correlating a delay length of time to the data function; and
   altering the first delay of the data function to a second delay in response to the assigned priority value and collected information about the first target storage array.

2. The method of claim 1, wherein the information collected by the replication management module comprises a definition of the first target storage array of the downstream data storage system and a second target storage array of the downstream data storage system.

3. The method of claim 1, wherein the second delay is reordered in a replication table in accordance with the priority value assigned by the replication management module.

4. The method of claim 1, wherein the replication management module resides in the upstream user.

5. The method of claim 1, wherein the data manipulation of the data function is a write to the target storage array.

6. The method of claim 1, wherein the data manipulation of the data function is an update to the target storage array.

7. The method of claim 1, wherein the data manipulation of the data function is a delete to the target storage array.

8. The method of claim 1, wherein the data manipulation of the data function is a read to the target storage array.

9. The method of claim 1, wherein the first delay and second delay are different and the second delay corresponds with the data function being replicated to multiple different target data storage arrays.

10. A method comprising:
    connecting a replication management module to a first upstream user and a downstream data storage system;
    assigning a first delay to each of a first function and a second function originating from the first upstream user with the replication management module based on a data manipulation corresponding to respective functions;
    conducting an information gathering process with a processor of the replication management module to collect information about at least a first target storage array of the downstream data storage system and a second target storage array of the downstream data storage system;
    assigning a first priority value to the first function and a second priority value to the second with the replication management module based on the collected information about the respective target storage arrays, each priority value correlating a delay length of time to the respective data functions; and
    altering the first delay of the first function to a second delay in response to the assigned first priority value and the collected information about the first target storage array.

11. The method of claim 10, wherein the first delay and second delay are different and the second delay corresponds with a data associated with the data function being replicated to the first and second target data storage arrays.

12. The method of claim 10, wherein the second function remains with the first delay in response to a collected information about the second target data storage array.

13. The method of claim 10, wherein the second function is different than the first function.

14. The method of claim 10, wherein the second function is assigned a third delay in response to the collected information about the second target data storage array, the third delay being different than the first delay and the second delay.

15. The method of claim 10, wherein the replication management module maintains at least one monitoring database that tracks the assignment of the respective delays to the respective functions.

16. The method of claim 15, wherein the at least one monitoring database maintains a queue of pending functions awaiting execution upon expiration of the respective assigned delay.

17. The method of claim 15, wherein the at least one monitoring database stores a before image and an after image of a data modified by the first function or second function.

18. The method of claim 10, wherein the replication management module is connected to a second upstream user providing a third function initially assigned the first delay before being assigned a third delay in response to the collected information about the first target data storage array, the second delay and third delay being different.

19. An apparatus comprising a replication management module connected to an upstream user and a downstream data storage system, the replication management module assigning a first delay to a data function originating from the upstream user based on a data manipulation corresponding to data function prior to conducting an information gathering process to collect information about first target storage array of the downstream data storage system and assign a priority value to the data function, based on the collected information about the first target storage array, that correlates to a delay length of time and alters the first delay of the data function to a second delay, the priority value assigned by the replication management module in response to the collected information about the target storage array.

20. The apparatus of claim 19, wherein the upstream user comprises a server having a local memory and the processor.

* * * * *